United States Patent
Shibuya et al.

(10) Patent No.: US 6,710,564 B2
(45) Date of Patent: Mar. 23, 2004

(54) METHODS AND APPARATUS FOR CONTROLLING BRUSHLESS MOTORS

(75) Inventors: Makoto Shibuya, Isesaki (JP); Norimasa Takano, Isesaki (JP)

(73) Assignee: Sanden Corporation, Gunma (JP)

( * ) Notice: Subject to any disclaimer, the term of this patent is extended or adjusted under 35 U.S.C. 154(b) by 10 days.

(21) Appl. No.: 10/223,609

(22) Filed: Aug. 20, 2002

(65) Prior Publication Data

US 2003/0057907 A1 Mar. 27, 2003

(30) Foreign Application Priority Data

Aug. 29, 2001 (JP) ................................ P2001-259623

(51) Int. Cl.$^7$ ............................................. H01R 39/46
(52) U.S. Cl. ..................... 318/439; 318/138; 318/254; 318/801; 318/811
(58) Field of Search ........................ 318/254, 138, 318/439, 434, 801, 811; 363/98

(56) References Cited

U.S. PATENT DOCUMENTS

| | | |
|---|---|---|
| 3,670,224 A | 6/1972 | Jensen |
| 3,967,173 A | 6/1976 | Stich |
| 4,511,835 A | 4/1985 | Studtmann |
| 4,743,815 A | 5/1988 | Gee et al. |
| 5,640,073 A | 6/1997 | Ikeda et al. |
| 5,694,010 A | 12/1997 | Oomura et al. |
| 5,805,438 A * | 9/1998 | Takada et al. ................. 363/98 |
| 6,060,859 A * | 5/2000 | Jonokuchi .................... 318/801 |
| 6,153,993 A | 11/2000 | Oomura et al. |
| 6,324,085 B2 * | 11/2001 | Kimura et al. .............. 363/132 |
| 6,396,225 B1 * | 5/2002 | Wakui et al. ................ 318/254 |

FOREIGN PATENT DOCUMENTS

| | | |
|---|---|---|
| JP | 2001078485 | 3/2001 |
| JP | 2001103785 | 4/2001 |
| JP | 2001119984 | 4/2001 |

* cited by examiner

*Primary Examiner*—Karen Masih
(74) *Attorney, Agent, or Firm*—Baker Botts L.L.P.

(57) ABSTRACT

A method or apparatus for controlling a brushless motor having an inverter. The inverter comprises a first and a second plurality of switching elements at a first and second phase sides, respectively, and a drive control device. The drive control device switches either a state of the first or the second plurality of switching elements. A first transient voltage is generated in each second switching element when the state of the second plurality of switching elements is switched. The second transient voltage is generated in each first switching element when the state of the first plurality of switching element is switched. Timing of switching the state of the first plurality of switching elements by the PWM control is altered, such that a combined voltage of the first and the second transient voltage is less than a maximum allowable voltage of the first plurality of switching element or of the second plurality of switching elements.

16 Claims, 11 Drawing Sheets

US 6,710,564 B2

METHODS AND APPARATUS FOR CONTROLLING BRUSHLESS MOTORS

BACKGROUND OF THE INVENTION

1. Field of the Invention

The present invention relates generally to methods and apparatus for controlling brushless motors used for driving compressors in automotive air conditioning system. In particular, the present invention relates to methods and apparatus for controlling brushless motors used for driving compressors in automotive air conditioning system. Such compressors are driven by electricity used in electrically driven vehicles, such as hybrid vehicles, fuel-cell vehicles, or the like.

2. Description of Related Art

Electrically driven vehicles including hybrid vehicles, fuel-cell vehicles, or the like, which have electric driving sources, have been developed in order to reduce environmental contamination. Such electrically driven vehicles generally have an air conditioning system including a compressor driven by a brushless motor. An inverter delivers driving power in three-phase current to the brushless motor.

Apparatus for controlling such brushless motors are known in the art. Such known apparatus may include an inverter. For example, known apparatus for controlling brushless motors are disclosed in Japanese Unexamined Patent Publication Nos. 2001-103785, 2001-119984, and 2001-78485. In such known apparatus, direct current (DC) is provided from a DC power source, e.g., a battery, to the inverter. The inverter controls a plurality of switching elements by switching a state on-and-off to achieve phase switching. As such, power output from the inverter is generated in the form of a three-phase-current and is provided to the brushless motor. At the same time, the switching time for each switching element in the on-state is controlled by a known pulse width modulation (PWM) control. An electric power supplied to the brushless motor may be varied, and a rotational speed of the brushless motor may be adjusted. As a result, the rotational speed of the compressor in the air conditioning system for a vehicle may be adjusted, and the temperature in a compartment of the vehicle may be adjusted.

As shown in FIG. 8, one example of a known apparatus for controlling a brushless motor using a PWM control is depicted. The known apparatus includes a switching elements group 92 having six switching elements 92U, 92V, 92W, 92X, 92Y, and 92Z, a filter circuit 94, a controller 95, a memory 96, and a voltage detector 97. Controller 95 detects a rotational position of a brushless motor 93 via filter circuit 94. Subsequently, controller 95 may drive switching elements 92U, 92V, 92W, 92X, 92Y, and 92Z based on the detected rotational position. A direct current output from a DC power source 91 may be converted to a three-phase current at switching elements group 92, and the three-phase current may then be provided to motor 93.

In addition, as shown in a timing chart of FIG. 9, switching the state of switching elements 92X, 92Y, and 92Z on and off on a lower side of the inverter is controlled by the PWM control, so that an electric power supplied to motor 93 is varied. As a result, the rotational speed of motor 93 may be adjusted.

Nevertheless, when switching elements 92U, 92V, 92W, 92X, 92Y, and 92Z are switched on and off, due to the influence of stray inductors $L_1$ and $L_2$ shown in FIG. 8, an upsurging voltage (hereinafter a "transient voltage") may occur between an emitter and a collector of switching elements 92U, 92V, 92W, 92X, 92Y, or 92Z when switched into the off-state because of the transient voltage phenomena. When the flow of current is increased in motor 93, a frequency with which the state of each switching elements 92U, 92V, 92W, 92X, 92Y, or 92Z is switched. As a result, the maximum value of the transient voltage may be increased. Therefore, the transient voltage may affect a threshold voltage in selecting each switching elements 92U, 92V, 92W, 92X, 92Y, or 92Z.

As shown in FIG. 10, a first transient voltage $V_1$ occurs between an emitter and a collector of switching elements 92U, 92V, and 92W in the off state, when switching elements 92U, 92V, and 92W at an upper side of the inverter are switched on and off. A second transient voltage $V_2$ occurs between an emitter and a collector of switching elements 92X, 92Y, and 92Z in off-state, when switching elements 92X, 92Y, and 92Z are switched on and off at the lower side of the inverter by the PWM control. Moreover, both the first transient voltage $V_1$ and the second transient voltage $V_2$ are greater than the voltage in a normal condition. This relationship between voltages is known in the art.

In addition, as shown in FIG. 11, if duty ratio of the PWM control is varied, the timing of the occurrence of the second transient voltage $V_2$ is advanced, and waveforms of the first transient voltage $V_1$ and the second transient voltage $V_2$ overlap. As a result, the first transient voltage $V_1$ and the second transient voltage $V_2$ are combined, and a third transient voltage $V_3$ may occur. The maximum value of third transient voltage $V_3$ may be greater than that of first transient voltage $V_1$ and second transient voltage $V_2$. Due to the occurrence of the third transient voltage $V_3$, certain problems may arise. First, if the third transient voltage $V_3$ exceeds a maximum allowable voltage Vmax of switching elements 92U, 92V, 92W, 92X, 92Y, or 92Z, switching elements 92U, 92V, 92W, 92X, 92Y, or 92Z may be damaged or destroyed. Second, in order to avoid damaging switching elements 92U, 92V, 92W, 92X, 92Y, or 92Z, if the switching elements having a greater maximum allowable voltage Vmax are selected, the cost of the switching elements may increase. Third, a noise occurring at the inverter may be increased due to the presence of the third transient voltage $V_3$. A malfunction of electric circuits in the inverter may occur due to the noise, and the noise may affect another electrical components. Fourth, in order to suppress the third transient voltage $V_3$, a large, transient voltage absorbing circuit may be necessary. As a result, the manufacturing cost and the size of the apparatus for controlling the brushless motor may be increased.

SUMMARY OF THE INVENTION

Therefore, a need has arisen for apparatus for controlling brushless motor and methods of employing such apparatus that overcome these and other shortcomings of the related art. A technical advantage of the present invention is that negative effects due to a transient voltage, occurring at the time during which switching elements are operated or cycled, may be reduced in a low cost.

According to an embodiment of the present invention, a method or apparatus for controlling a brushless motor has an inverter providing a current to the brushless motor. The inverter comprises a first plurality of switching elements, a second plurality of switching elements, and a drive control device. The first plurality of switching elements are connected between a first terminal of a DC power source and a phase terminal of each coil of the brushless motor. The second plurality of switching elements are connected between a second terminal of the power source and a phase terminal of each coil of the brushless motor. The drive control device selects a state of the first plurality of switching elements and switches either the state of the first plurality of switching elements or the state of the second plurality of switching elements by mean of a pulse width modulation (PWM) control, so that the drive control device controls a rotational speed of the brush less motor. The switching of the state of the first plurality of switching elements by the PWM control is altered, i.e., advanced (made to occur earlier) or delayed (made to occur later), such that a combined voltage of a first transient voltage and a second transient voltage is less than a voltage limit, e.g., a maximum allowable voltage, of the first plurality of switching elements or of the second plurality of switching elements. The first transient voltage is generated between an input terminal and an output terminal of each second switching element in the off-state, when the state of the second plurality of switching elements is switched. The second transient voltage is generated between an input terminal and an output terminal of each first switching element in the off-state, when the first plurality of switching elements is switched. In another embodiment, the switching of the state of the second plurality of switching elements by the PWM control is delayed, such that a combined voltage of a first transient voltage and a second transient voltage is less than a voltage limit, e.g., a maximum allowable voltage, of the first plurality of switching elements or of the second plurality of switching elements. The second transient voltage is generated between an input terminal and an output terminal of each second switching element in the off-state, when the state of the first plurality of switching elements is switched. The second transient voltage is generated between an input terminal and an output terminal of each second switching element in the off-state, when the second plurality of switching element is switched.

Other objects, features, and advantages of embodiments of this invention will be apparent to persons of ordinary skill in the art from the following detailed description of the invention and the accompanying drawings.

BRIEF DESCRIPTION OF THE DRAWINGS

For more complete understanding of the present invention, the needs satisfied thereby, and the objects, features, and advantages thereof, reference now is made to the following descriptions taken in connection with the accompanying drawings.

DETAILED DESCRIPTION OF PREFERRED EMBODIMENTS

Figure 1:
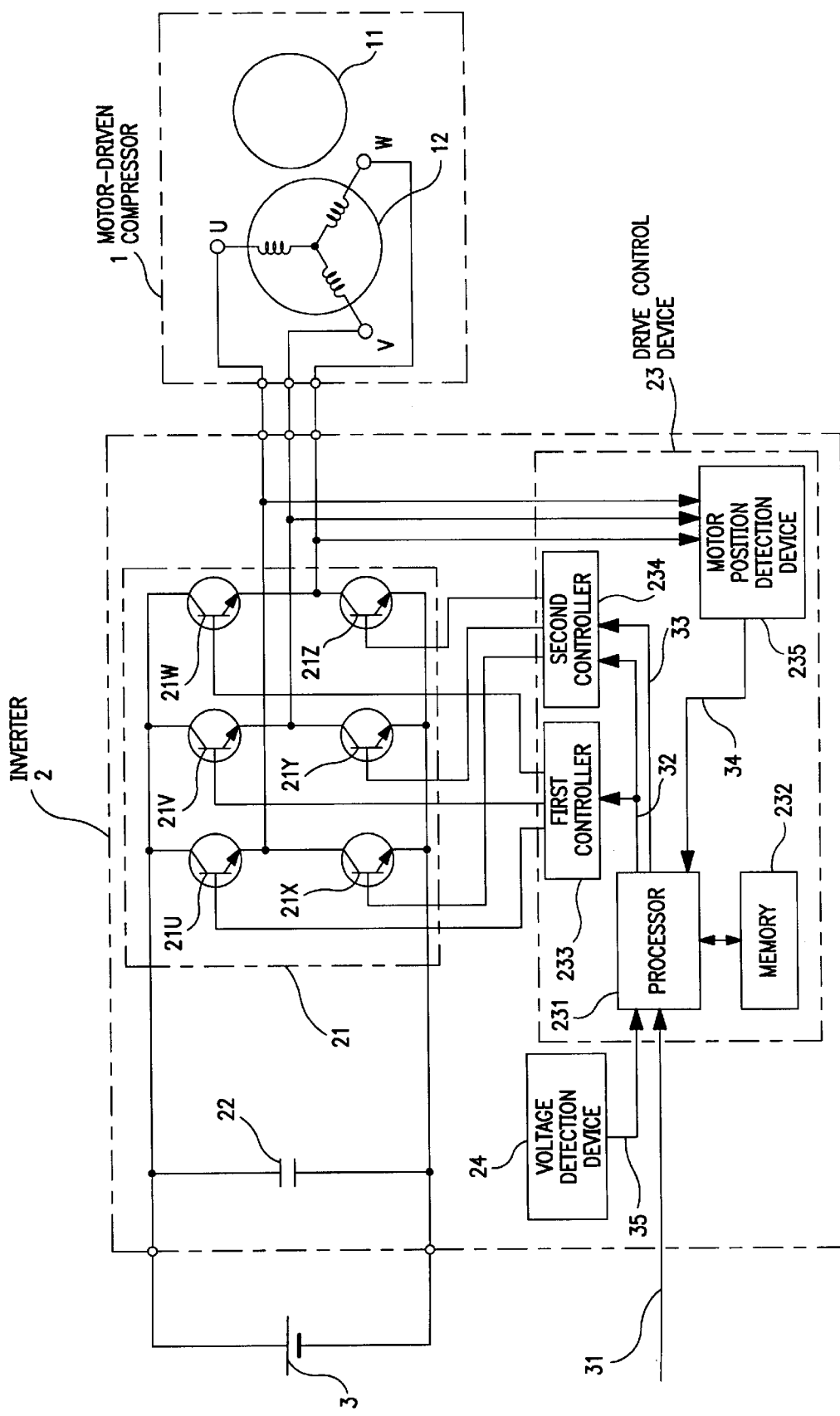
FIG. 1 is a schematic of an apparatus for controlling the driving of a brushless motor, according to an embodiment of the present invention.

Referring to FIG. 1, an apparatus for controlling a brushless motor 12 according to an embodiment is described. A motor-driven compressor 1 comprises a compressor 11 and a brushless motor 12. Brushless motor 12 may be a three-phase brushless motor having three phase winding coils.

An inverter 2 comprises a switching elements group 21, a capacitor 22 for smoothing the voltage, a drive control device 23, and a voltage detection device 24. Switching elements group 21 comprises six semiconductor, switching elements (hereinafter called "switching elements") 21U, 21V, 21W, 21X, 21Y, and 21Z. Each switching element 21U, 21V, 21W, 21X, 21Y, and 21Z may be a npn transistor. Direct current (DC) electricity provided from a DC power source 3, e.g., a battery, is converted to three-phase-current, and the three-phase-current is provided to brushless motor 12.

In switching elements 21U, 21V, and 21W at an upper side of inverter 2, each collector is connected to a positive terminal of power source 3, and each emitter is connected to a phase terminal (U phase, V phase, or W phase) of brushless motor 12. Moreover, each base of switching elements 21U, 21V, and 21W is connected to a first controller 233 of drive control device 23. The state of each of switching elements 21U, 21V, and 21W is switched on and off by an activation signal, which is input from first controller 233 to the base of each of switching elements 21U, 21V, and 21W.

In switching elements 21X, 21Y, and 21Z at a lower side of inverter 2, each collector is connected to each phase terminal (U phase, V phase, and W phase) of brushless motor 12, and each emitter is connected to a negative terminal of power source 3. Moreover, each base of switching elements 21X, 21Y, and 21Z connected to a second controller 234 of drive control device 23. The state of each of switching elements 21X, 21Y, and 21Z is switched on and off by an activation signal, which is input from second controller 234 to the base of each of switching elements 21X, 21Y, and 21Z.

In addition, in six switching element 21U, 21V, 21W, 21X, 21Y, and 21Z, an area between an output terminal and an input terminal is an area between the collector and the emitter. The collector or the emitter may be the output terminal or the input terminal. In this embodiment of the present invention, each switching elements may be a npn transistor, employing a field-effect transistor (FET). In this case, the output terminal and the input terminal are electrodes functioning as a drain and a source.

Drive control device 23 includes a processor 231, a memory 232, first controller 233, second controller 234, and a motor position detection device 235. Because drive control device 23 includes a known central processing unit (CPU) and is an integrated circuit mixing software and hardware, each processor 231, memory 232, first controller 233, second controller 234, and detection device 235 is shown as a functional block diagram. Processor 231 corresponds to a phase switching device and a portion of a PWM control device. First controller 233 corresponds to an on-setting device. Second controller 234 corresponds to another portion of the PWM control device. Detection device 235 corresponds to a motor position detection device.

A rotational speed determining signal 31, which is provided from a system controller (not shown); a voltage detection signal 35, which is provided from voltage detection device 24; and a motor position detection signal 34, which is provided from motor position detection device 235, are input to processor 231. Processor 231 processes these signals 31, 35, and 34. In accordance with the result of his processing, processor 231 transmits a phase switching signal 32 to first controller 233 and second controller 234, and transmits a PWM duty instruction signal 33 to second controller 234. In this embodiment, processor 231 inputs position detection signal 34 from detection device 235 in synchronization with a time period T of a clock signal. When a time $T_{est}$ elapses after processor 231 inputs position detection signal 34, processor 231 outputs phase switching signal 32 and PWM duty instruction signal 33.

Memory 232 stores a program to operate drive control device 23 and includes a random access memory (RAM), which is used to process the signals. Based on phase switching signal 32 provided from processor 231, first controller 233 transmits a driving signal in order to switch the state of each switching elements 21U, 21V, and 21W at the upper side of inverter 2. In this embodiment, the driving of three-phase motor 12 is controlled, so that one of switching elements 21U, 21V, and 21W is set in the on-state by rotation in response to a phase switching. If the upper side, switching elements and the lower side, switching elements are combined, the phase switching may occur at electrical phase in angles of sixty degree (60°) intervals. Only at the upper side, switching elements, the phase switching may occur at electrical phase angles in one hundred and twenty degree (120°) intervals.

Based on phase switching signal 32 provided from processor 231, second controller 234 sends a driving signal in order to switch the state of each switching element 21X, 21Y, and 21Z at the lower side of inverter 2. In this embodiment, the driving of three phase motor 12 is controlled, so that one of switching elements 21X, 21Y, and 212 is set in the on-state by rotation in response to a phase switching signal 32. A pulse signal having a duty ratio in accordance with PWM duty instruction signal 33 is sent to on-state switching elements 21X, 21Y, or 21Z in synchronization with the time period T of the clock signal. As described above, if the upper side and the lower side of inverter 2 are combined, the phase switching may occur at every electrical phase angle in sixty degree (60°) intervals, and only at the upper side of inverter 2, the phase switching may occur at every electrical phase angle in one hundred and twenty degree (120°) intervals.

Motor position detection device 235 detects a back electromotive force from the input terminals of motor 12 in synchronization with time period T of the clock signal. As the result of the detection of his back electromotive force, motor position detection device 235 sends position detection signal 34 representing a rotational position of motor 12 to processor 231. Voltage detection device 24 detects a phase current value as a voltage value, and sends the detected result to processor 231.

Figure 2:
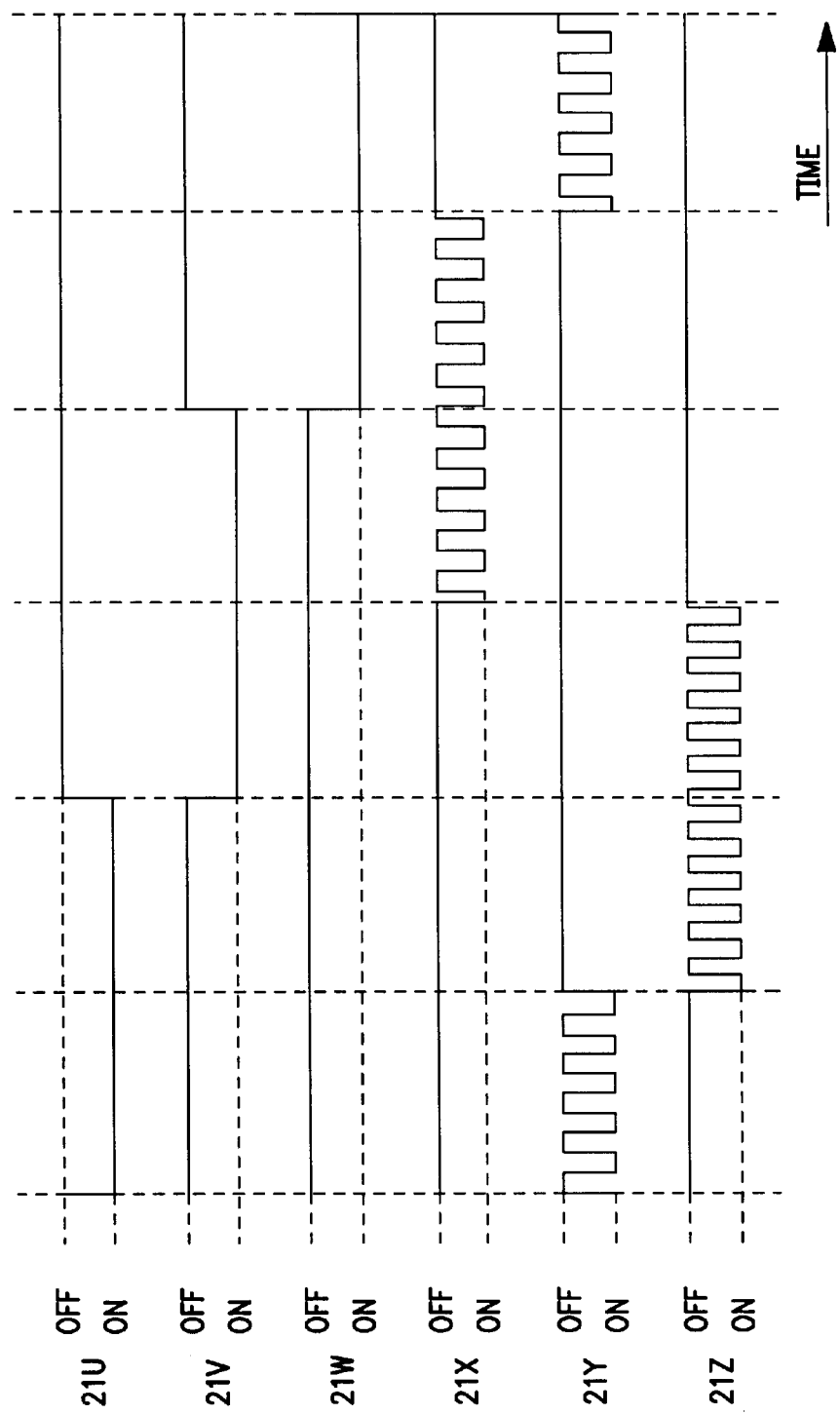
FIG. 2 is a timing chart showing a driving control pattern of the brushless motor, according to the embodiment of the present invention.

FIG. 2 depicts a timing chart showing a driving control signal operated by PWM control. A rotational speed of brushless motor 12 may be varied by the PWM control, which is operated in drive control device 23. A driving control pattern shown in FIG. 2 is an example, when switching elements 21X, 21Y, and 21Z at the lower side of inverter 2 are chopped by the PWM control. When the state of switching elements 21X, 21Y, and 21Z are switched on and off, due to the influence of stray inductors $L_1$ and $L_2$ as described in the related art, a transient voltage may occur between each emitter and each collector of switching elements 21U, 21V, 21W, 21X, 21Y, and 21Z because of transient phenomena. When the flow of the current is increased in motor 12, and when a frequency with which the state is switched for each switching element 21U, 21V, 21W, 21X, 21Y, or 21Z, also increases the transient voltage may increase. Therefore, the threshold voltage is an important factor in selecting the switching elements to cope with the transient voltage. Moreover, if the transient voltage increases, the noise generated in inverter 2 may increase. In general, the transient voltage may be decreased to some degree by adding a transient voltage absorbing circuit, e.g., capacitor 22, which is connected between both poles of DC power source 3.

In inverter 2, if the current flowing in switching elements 21U, 21V, 21W, 21X, 21Y, and 21Z for driving motor 12 exceeds the maximum rated current, heat generation may occur at switching elements 21U, 21V, 21W, 21X. 21Y, and 21Z, and switching elements 21U, 21V, 21W, 21X, 21Y, and 21Z may be damaged or destroyed. Therefore, so as not to exceed the maximum rated current of switching elements 21U, 21V, 21W, 21X, 21Y, and 21Z, if the phase current flowing in motor 12 is greater than or equal to the predetermined threshold, motor 12 may be stopped. On the other hand, in order to avoid generating a voltage exceeding a maximum allowable voltage Vmax when the first transient voltage $V_1$ and the second transient voltage $V_2$ overlap, the control operates as explained hereinafter.

Figure 3A:
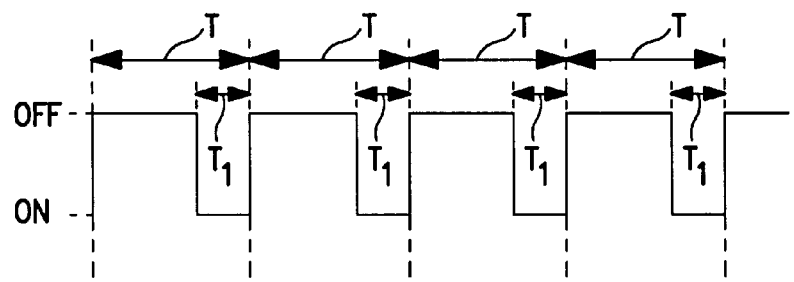
FIGS. 3A–3B is a timing chart showing a PWM control pattern of the brushless motor, according to the embodiment of the present invention.
Figure 3B:
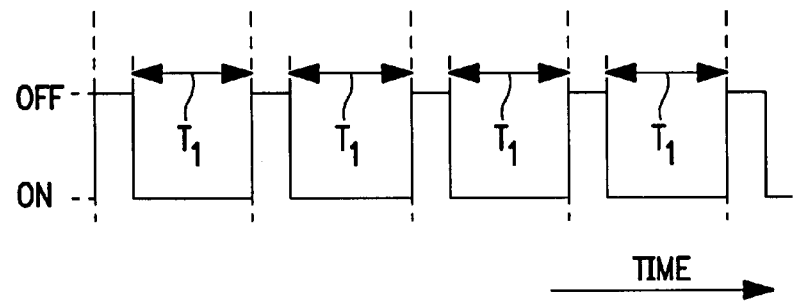

In this embodiment, drive control device 23 inputs motor position detection signal 34 in synchronization with the time period T of the clock signal and outputs the PWM pulse signal. As shown in FIG. 3, switching elements 21X, 21Y, and 21Z at the lower side of inverter 2 in the on-state turns the switch elements to the off-state. During a time period $T_1$ within the time period T, switching elements 21X, 21Y, and 21Z are in the on-state. If the PWM duty ratio is increased, a time period $T_1$, during which switching elements 21X, 21Y, and 21Z are in the on-state, may be increased. FIG. 3(a) depicts the situation in which the PWM duty ratio is decreased and FIG. 3(b) depicts the situation in which the PWM duty ratio increases.

Figure 4:
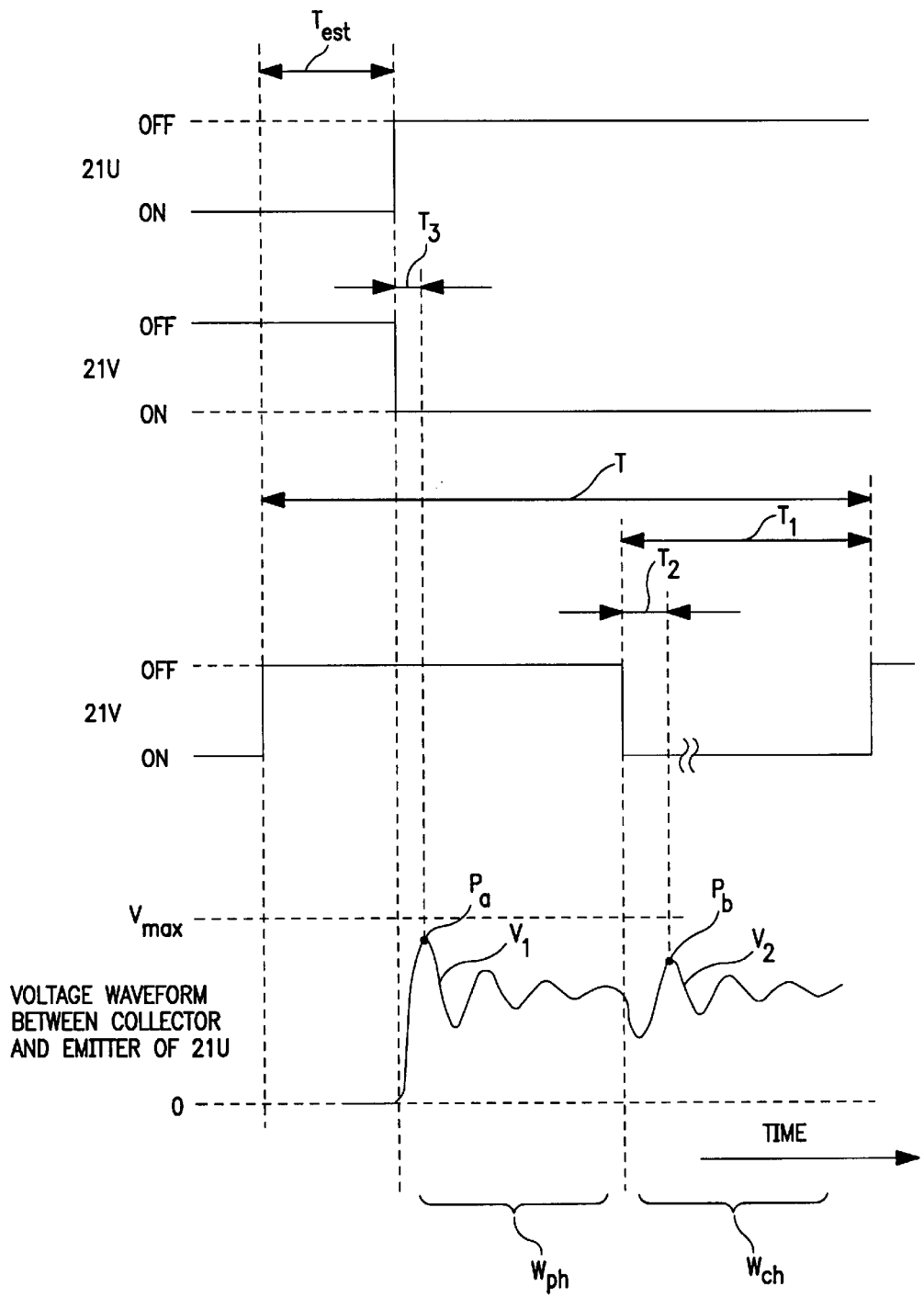
FIG. 4 is a timing chart showing the PWM control pattern with a transient voltage, according to the embodiment of the present invention.

As shown in FIG. 4, when a time period $T_{est}$ has elapsed, the phase of switching elements 21U, 21V, and 21W at the upper side of inverter 2 is changed. The time period $T_{est}$ is the amount of time between the switching of switching elements 21X, 21Y, and 21Z into the on-state and the switching of these elements into the off-state. The time period $T_{est}$ is the time to process in drive control device 23. Moreover, a time period $T_2$ and a time period $T_3$ shown in FIG. 4 are estimated in advance, and based on this estimate, the control program of drive control device 23 is programmed. The time period $T_2$ is measured from when switching elements 21X, 21Y, and 21Z at the lower side in the on-state turns into the off-state by the PWM control, until a first maximum value $P_b$ occurs at the second transient voltage $V_2$ generated between each collector and each emitter of switching elements 21U, 21V, 21W, 21X, 21Y, and 21Z in the off-state of inverter 2. The time period $T_3$ is measured from when switching elements 21U, 21V, and 21W at the upper side in inverter 2 in the off-state is turned into the on-state by the PWM control, until a first maximum value $P_a$ occurs at the first transient voltage $V_2$ generated between each collector and the emitter of each switching elements. 21U, 21Y, 21W, 21X, and 21Z in the off-state.

Figure 5:
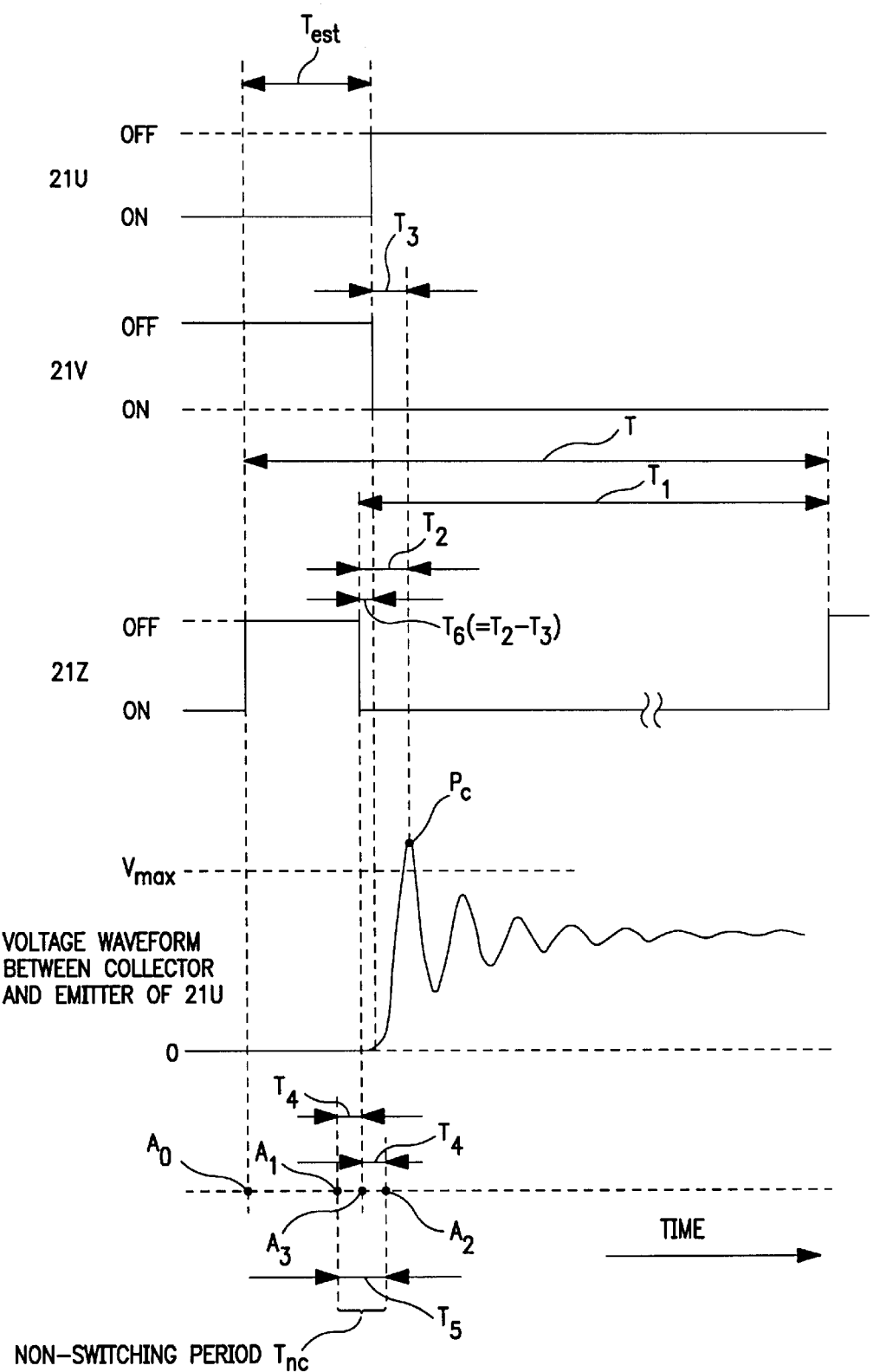
FIG. 5 is a timing chart showing a substantial portion of the PWM control, according to the embodiment of the present invention.

Nevertheless, advancing a timing of the switching of the lower side, switching elements 21X, 21Y, and 21Z also advances a timing of the second transient voltage $V_2$, As such the first maximum value $P_a$ of the first transient voltage $V_1$ and the first maximum value $P_b$ of the second transient voltage $V_2$ overlap, such that a maximum voltage value $P_c$ greater than the first maximum value $P_a$ and the second maximum value $P_b$ is generated, as shown in FIG. 5. By measuring the time period $T_2$ and the time period $T_3$, the timing of the occurrence at the maximum value $P_c$ may be estimated. In particular, when the state of switching, elements 21X, 21Y, and 21Z at the lower side of inverter 2 is switched on and off within a time period $T_6$ ($T_6=T_2-T_3$), which is measured from, and occurs before, the timing of switching of the state of switching elements 21U, 21V, and 21W at the upper side of inverter 12, the maximum value $P_c$ is generated. The switching of the state of switching elements 21U, 21V, and 21W occurs when the time period ($T_{est}-T_6$) has elapsed from the starting point $A_0$ of the PWM period T.

In addition, as shown in FIG. 5, an accordance point $A_3$ is the point that the time period ($T_{est}-T_6$) measured from the starting point $A_0$ of the PWM period T. A time period $T_4$ is a predetermined period surrounding time period $T_6$ within which the combined transient voltages are greater than or equal to Vmax and less than $P_c$. A starting point $A_1$ is the time ($T_{est}-T_6-T_4$) measured from the starting point $A_0$ of the PWM period T. A termination point $A_2$ is the point that the time period ($T_{est}-T_6+T_4$) measured from the starting point $A_0$ of the PWM period T. A time period $T_4$ is the time before or after from the accordance point $A_3$ to the starting point $A_1$ or the termination point $A_2$. A time period $T_5$ is the time duration, which is equal to twice time period $T_4$ (i.e., $T_4 \times 2$). In this embodiment, the time period $T_5$ is determined for a period within which the switch state does "not change," i.e., a non-switching period $T_{nc}$, for the PWM control. In the non-switching period $T_{nc}$, during which switching elements 21X, 21Y, and 21Z at the lower side of inverter 2 remain in a selected state, switching elements 21X, 21Y, and 21Z are controlled by the PWM control.

As described above, the timing of the start of the PWM period T, in other words, the time period of switching for the on-state to the off-state of switching elements 21X, 21Y, and 21Z at the lower side in inverter 2, and the time period during which processor 231 inputs motor position detection signal 34 are the same period. Therefore, if the PWM duty ratio is determined with respect to the non-switching period $T_{nc}$, a voltage exceeding the voltage limit, i.e., the maximum allowable voltage Vmax, of switching elements 21U, 21V, 21W, 21X, 21Y, or 21Z may not be generated.

Moreover, as shown in FIG. 4, when a voltage waveform $W_{ph}$ of the first transient voltage $V_1$ and a voltage wave form $W_{ch}$ of the second transient voltage $V_2$ shifted, or when the generating points (time points) of the first maximum value $P_a$ and the second maximum value $P_b$ are shifted, the voltage waveform $W_{ph}$ of me first transient voltage $V_1$ and the voltage waveform $W_{ch}$ of the second transient voltage $V_2$ are combined, and a maximum value is generated. Therefore, the time period $T_5$ of the non-switching period $T_{nc}$ is determined, such that the third maximum value is less than the maximum allowable voltage Vmax of switching elements 21U, 21V, 21W, 21X, 21Y, or 21Z. The time period $T_5$ need not be the same as the before-and-after time of the accordance point $A_3$.

Figure 6:
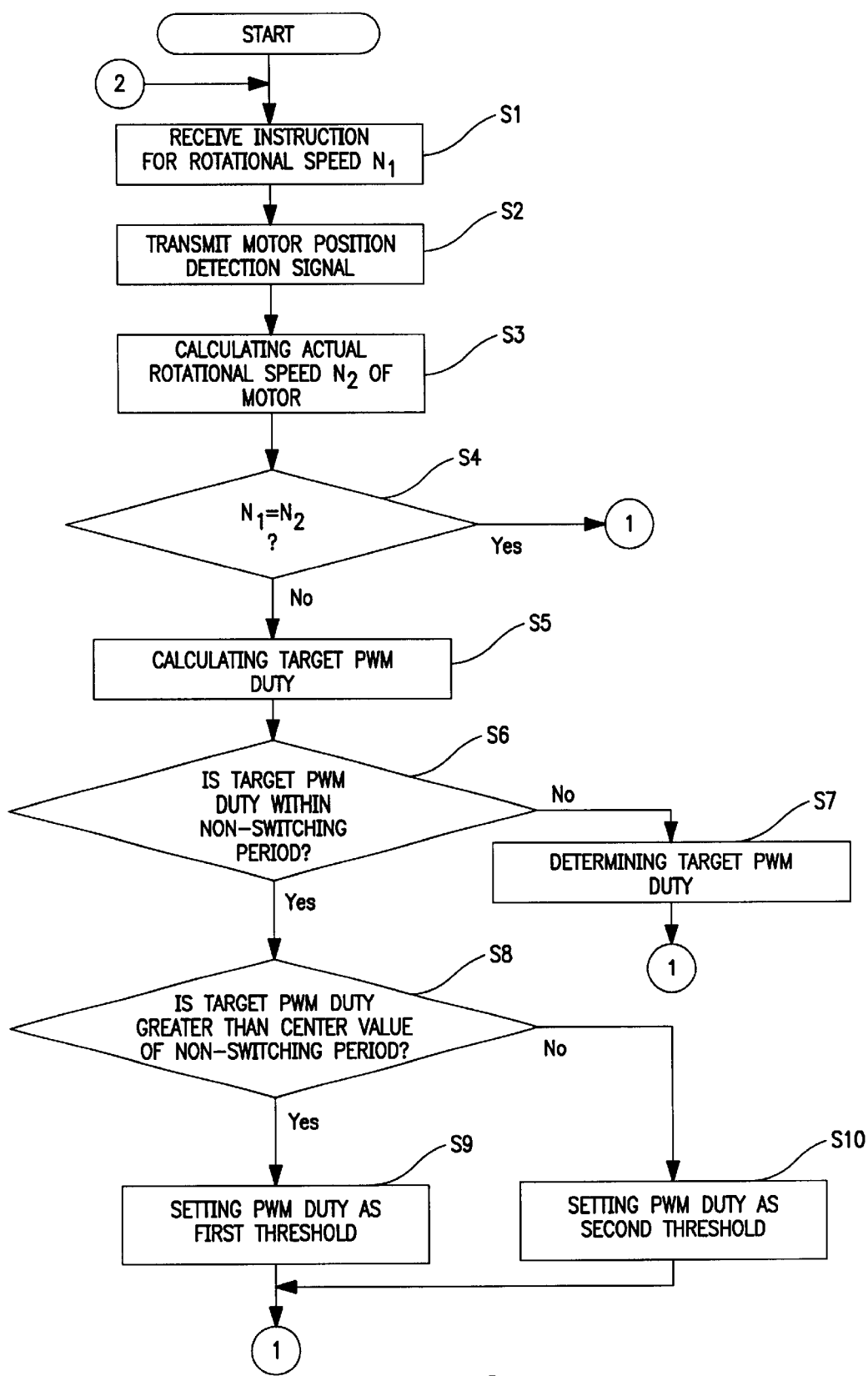
FIG. 6 is a flow chart showing a first part of the operation of the apparatus for controlling the driving of the brushless motor, according to the embodiment of the present invention.
Figure 7:
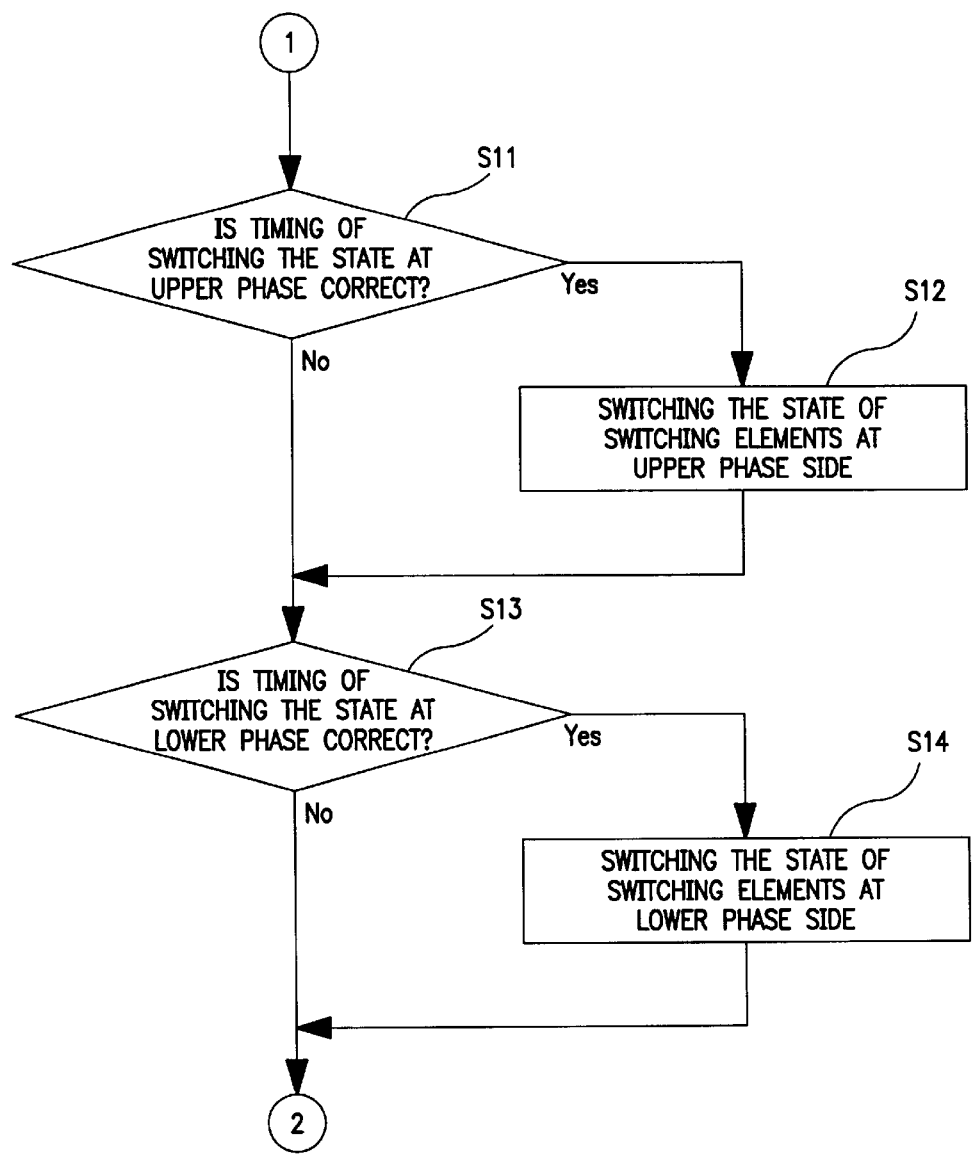
FIG. 7 is a flow chart showing a second part of the operation of the apparatus for controlling the driving of the brushless motor, according to the embodiment of the present invention.
Figure 8:
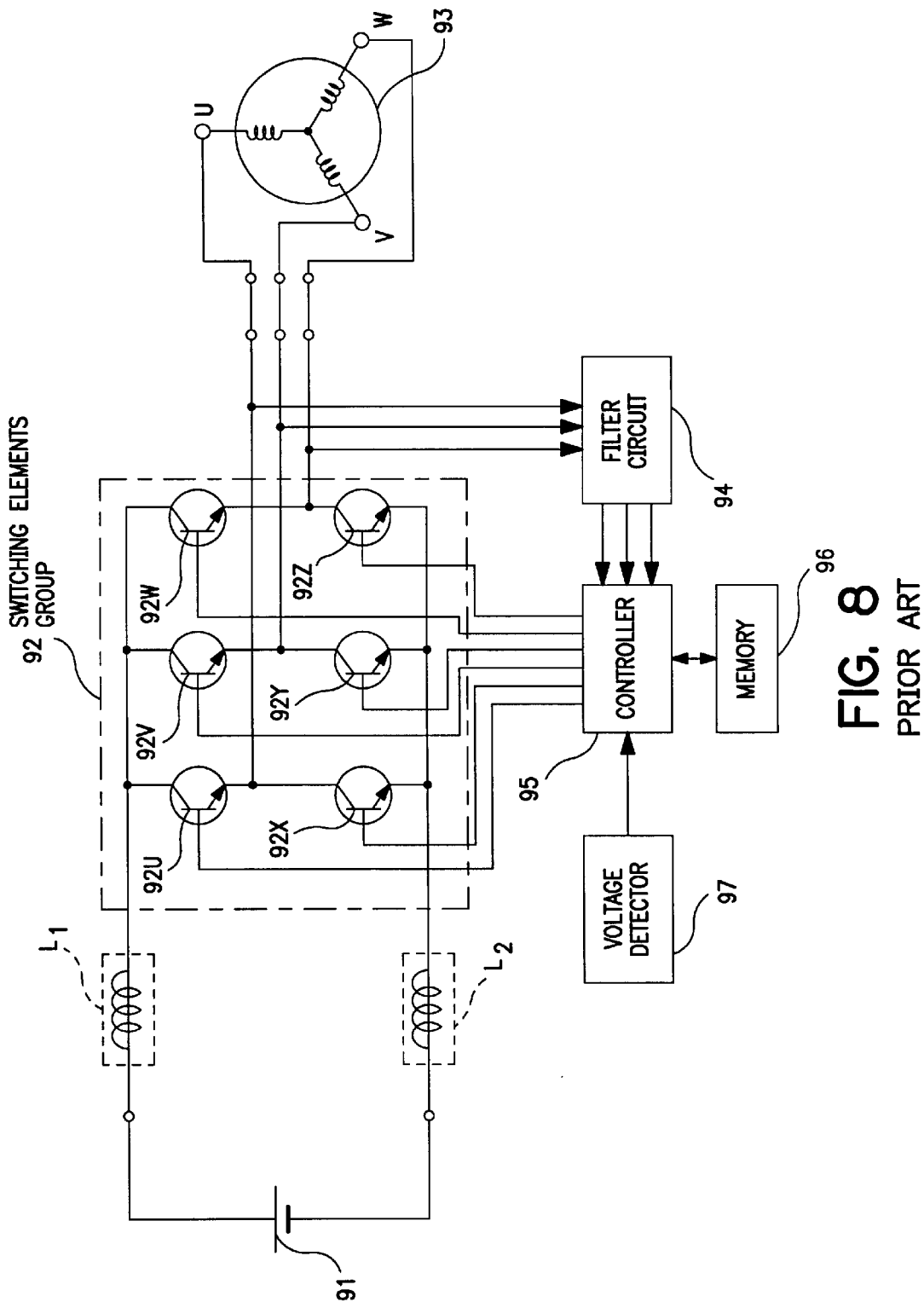
FIG. 8 is a schematic of a known apparatus for controlling a driving of a brushless motor.
Figure 9:
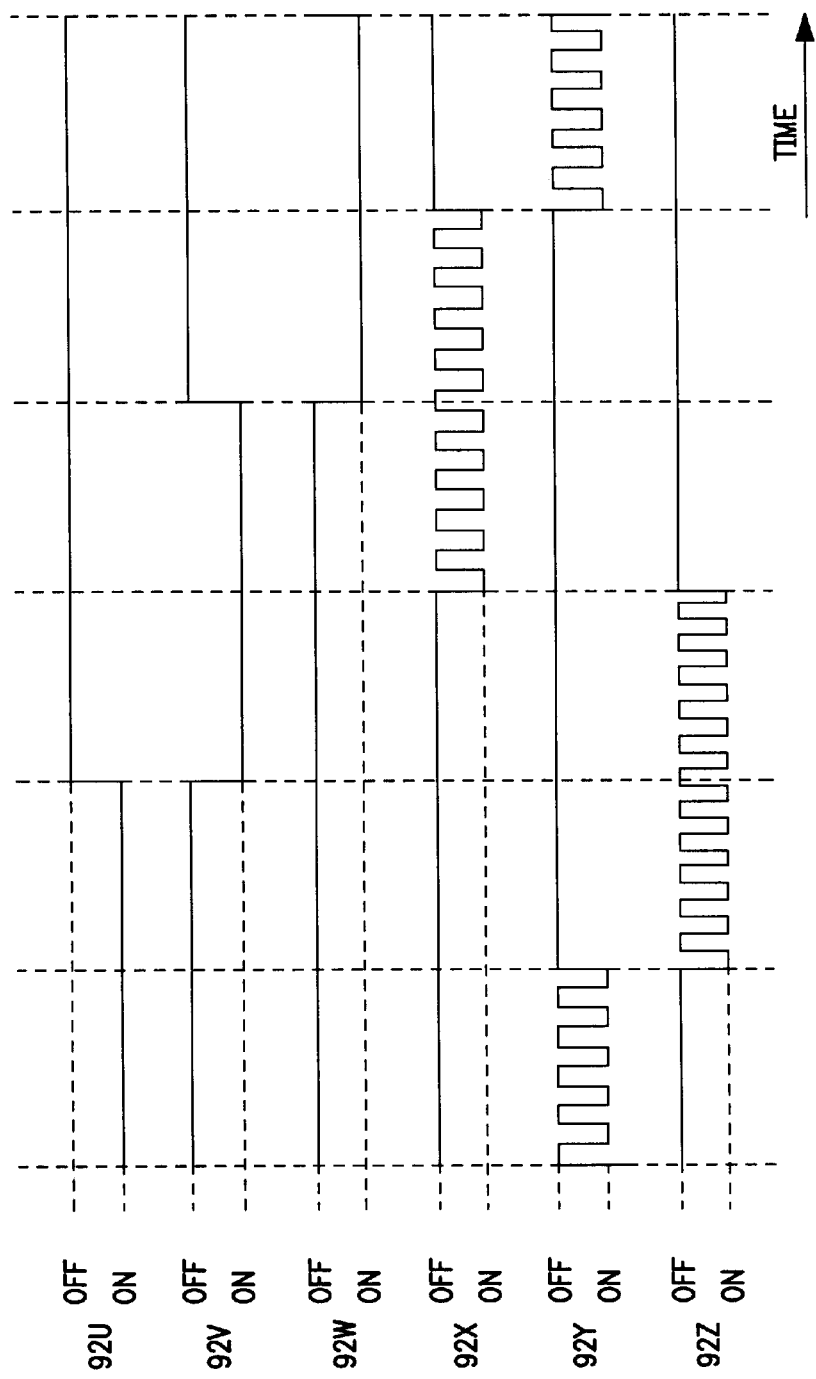
FIG. 9 is a timing chart showing a driving control pattern of the brushless motor of the known apparatus.
Figure 10:
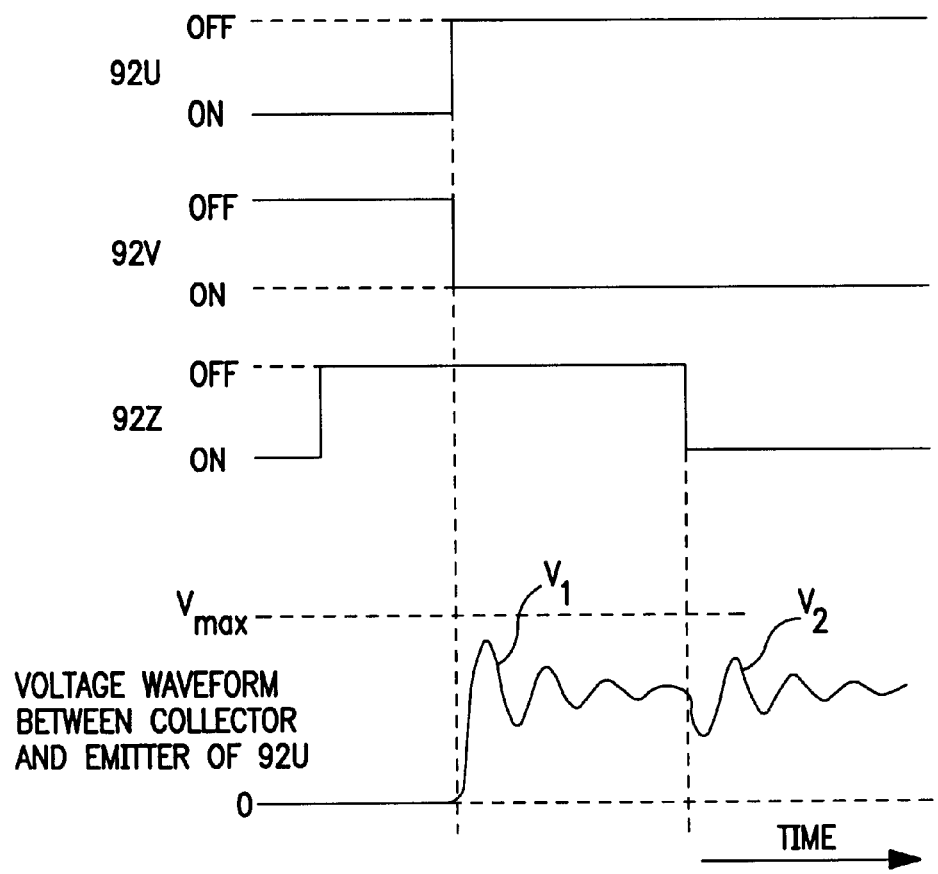
FIG. 10 is a first timing chart showing a PWM control pattern with a transient voltage, according to the known apparatus.
Figure 11:
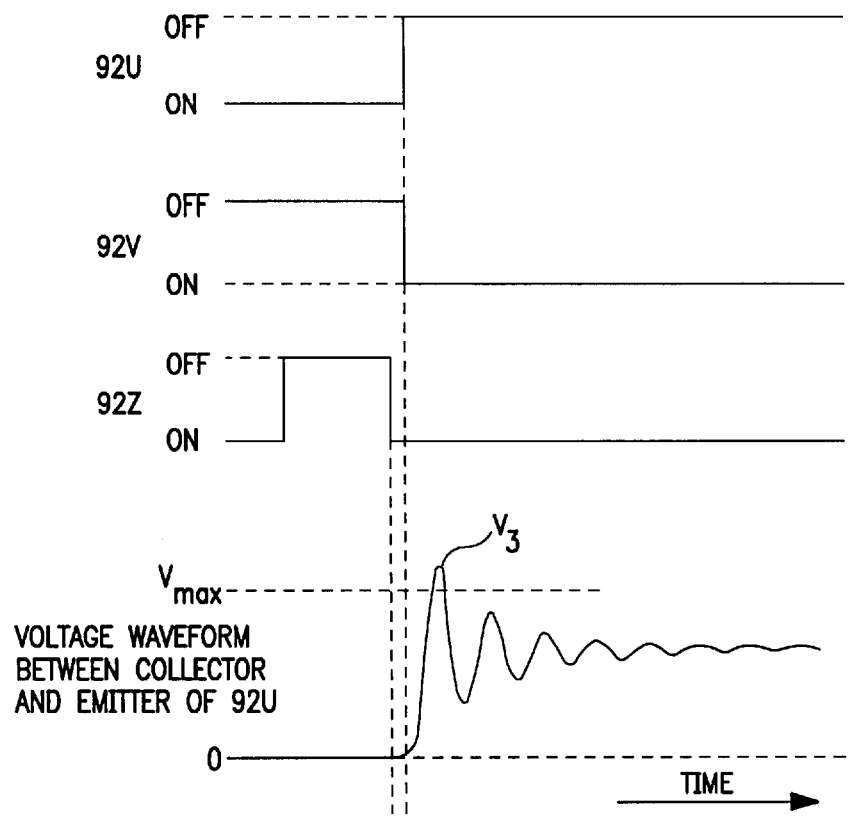
FIG. 11 is a second timing chart showing the PWM control pattern with a transient voltage, according to the known apparatus.

Referring to FIGS. 6 and 7, an operation of brushless motor 12 according to the embodiment of the present invention is described. When the operation of brushless motor 12 is started, drive control device 23 inputs rotational speed determining signal 31 provided from the main controller (not shown) in synchronization with the period T of the clock signal, and receives an instruction for rotational speed $N_1$ (step S1). Drive control device 23 transmits motor position detection signal 34 (step S2) to processor 231. Further, drive control device 23 calculates an actual rotational speed $N_2$ of motor 12 in accordance with detection signal 34 (step S3). Subsequently, drive control device 23 determines whether or not the instructed rotational speed $N_1$ is equal to the actual rotational speed $N_2$ (step S4). In this embodiment, drive control device 23 determines this equivalence (or substantial equivalence) or lack of equivalence by comparing time periods.

As the result of step S4, if the instructed rotational speed $N_1$ is equal to the actual rotational speed $N_2$, it is not necessary to alter the PWM duty period $T_1$ and the process proceeds from step S4 to step S11. Nevertheless, if the instructed rotation speed $N_1$ is not equal to the actual speed $N_2$, a new target PWM duty period is calculated (step S5).

Subsequently, drive control device 23 determines whether or not the calculated target PWM duty period is within the non-switching period $T_{nc}$ (step S6). More specifically, drive control device 23 determines whether or not the timing of switching the off-state to the on-state of switching elements 21X, 21Y, and 21Z at the lower phase side in the target PWM duty $T_1$ falls within the non-switching period $T_{nc}$ shown in FIG. 5.

As the result of step S6, if the timing of switching the off-state to the on-state of switching elements 21X, 21Y, and 21Z is not within the non-switching period $T_{nc}$, the calculated PWM duty period $T_1$ is determined. Switching elements 21X, 21Y, and 21Z at the lower side of inverter 2 are operated by the PWM control (step S7). Subsequently, the process proceeds from step S7 to step S11. Nevertheless, if the timing of switching the off-state to the on-state of switching elements 21X, 21Y, and 21Z is within the non-switching period $T_{nc}$, drive control device 23 determines whether or not the target PWM duty period is greater than the medium (center) value within the non-switching period $T_{nc}$ (step S8). More specifically, as shown in FIG. 5, drive control device 23 determines whether or not the timing of switching the off-state to the on-state of switching elements 21X, 21Y, and 21Z in the target PWM duty period $T_1$ occurs at the starting point $A_1$ side, from the center point (i.e., the accordance point $A_3$) of the non-switching period $T_{nc}$.

As the result of step S8, if the timing of switching the off-state to the on-state of switching elements 21X, 21Y, and 21Z in the target PWM duty period $T_1$ falls on the starting point $A_1$ side from the center point (i.e., the accordance point $A_3$) of the non-switching period $T_{nc}$, the PWM duty period $T_1$ is selected as a first threshold, and switching elements 21X, 21Y, and 21Z at the lower side of inverter 2 are operated in the PWM control (step S9). More specifically, the PWM duty period $T_1$ is determined as the timing of switching the off-state to the on-state of switching elements 21X, 21Y, and 21Z and to correspond with the starting point A1 of the non-switching period $T_{nc}$. Moreover, switching elements 21X, 21Y, and 21Z at the lower side of inverter 2 are operated in the PWM control.

Nevertheless, as the result of step S8, if the timing of switching the off-state to the on-state of switching elements 21X, 21Y, and 21Z in the target PWM duty period $T_1$ does not fall on the starting point $A_1$ side from the center point (i.e., the accordance point $A_3$) of the non-switching period $T_{nc}$, the PWM duty period $T_1$ is selected as a second threshold, and switching elements 21X, 21Y, and 21Z at the lower phase side are operated in the PWM control (step S10). More specifically, the PWM duty period $T_1$ is determined as the timing of switching the off-state to the on-state of switching elements 21X, 21Y, and 21Z and to correspond with the termination point $A_2$ of the non-switching period $T_{nc}$. Moreover, switching elements 21X, 21Y, and 21Z at the lower side of inverter 2 are operated in the PWM control.

Based on position signal 34 obtained in step S2, drive control device 23 determines whether or not the timing of switching the state of switching elements 21U, 21V, and 21W at the upper side of inverter 2 is correct (step S11). As the result of step S11, if the timing of switching the state of switching elements 21U, 21V, and 21W at the upper side of inverter 2 is correct, the state of switching elements 21U, 21V, and 21W is switched (step S12). Nevertheless, if the timing of switching the state of switching elements 21U, 21V, and 21W at the upper side is not correct, the process proceeds from step S11 to step S13.

Based on position signal 34 obtained in step S2, drive control device 23 determines whether or not the timing of switching the sate of switching elements 21X, 21Y, and 21Z at the lower side of inverter 2 is correct (step S13). As the result of step S13, if the timing of switching the state of switching elements 21X, 21Y, and 21Z at the lower side of inverter 2 is correct, the state of switching elements 21X, 21Y, and 21Z is switched (step S14). Subsequently, step S14 returns to step S1, and the process repeats steps S1 to S14. Nevertheless, if the timing of switching the state of switching elements 21X, 21Y, and 21Z at the lower side is not correct, the process returns from step S13 to step S1, and the process repeats steps S1 to S14.

As described above, in this embodiment of the present invention, during non-switching period $T_{nc}$ (i.e., the time period $T_5$) in which the timing that the first maximum value $P_a$ corresponds with the second maximum value $P_b$, the state of switching elements 21X, 21Y, and 21Z is not switched. Therefore, the combined voltage of the first transient voltage $V_1$ and the second transient voltage $V_2$ generated between each collector and each emitter of switching elements 21U, 21V, 21W, 21X, 21Y, and 21Z in the off-state may be maintained in the value less than the maximum allowable voltage Vmax of switching elements 21U, 21V, 21W, 21X, 21Y, or 21Z. Consequently, switching elements 21U, 21V, 21W, 21X, 21Y, or 21Z may not be damaged or destroyed. Moreover, because selecting the switching elements having the larger maximum allowable voltage Vmax is no longer necessary, the cost of inverter 2 need not increase. Because the noise generated in inverter 2 cased by the transient voltage may be reduced or eliminated, negative effects to, e.g., malfunction of, control circuits of inverter 2 or another electric control devices may be reduced or eliminated. Moreover, because a large size of a transient voltage absorbing circuit to reduce the transient voltage is no longer necessary, the cost and the size of inverter 2 need not increase.

In this embodiment of the present invention although the rotational speed of brushless motor 12 operated by the PWM control in a one hundred and twenty degree (120°) current-supply phase is described, switching elements 21U, 21V, 21W, 21X, 21Y, and 21Z at the upper and lower sides of inverter 2 may be alternately operated by the PWM control in sixty degree (60°) or one hundred and twenty degree (120°) current-supply phase intervals. Moreover, although switching elements 21X, 21Y, and 21Z at the lower side are operated by the PWM control, switching elements 21U, 21V, and 21W at the upper side also may be operated by the PWM control. In this alternative, the same advantages of the embodiment described above may be achieved.

In this embodiment of the present invention, the timing of switching the off-state to the on-state of switching elements 21X, 21Y, and 21Z at the lower side by the PWM control does not correspond with the timing of switching the state of switching elements 21U, 21V, and 21W at the upper side. The non-switching period $T_{nc}$ is determined with respect to the timing of switching the off-state to the on-state of switching elements 21X, 21Y, and 21Z at the lower side, and switching elements 21X, 21Y, and 21Z are controlled in the PWM control. Nevertheless, if the timing of switching the off-state to the on-state of switching elements 21X, 21Y, and 21Z at the lower side in the PWM control corresponds with the timing of switching the state of switching elements 21U, 21V, and 21W at the upper side, the non-switching period $T_{nc}$ is determined with respect to the timing of switching the off-state to the on-state of switching elements 21X, 21Y, and 21Z at the lower side. Moreover, switching elements 21X, 21Y, and 21Z are controlled in the PWM control. In this alternative, the same advantages of the embodiment described above may be achieved.

In this embodiment of the present invention, although methods and apparatus for controlling three-phase brushless motor 12 are described, the present invention may be applied to four (or more) phase brushless motors. In such alternatives, the same advantages of the embodiments may be achieved.

In addition, in the embodiment of the present invention, although transistors are used as switching elements 21U, 21V, 21W, 21X, 21Y, and 21Z, components other than transistors may be used as switching elements. In such alternatives, the same advantages of the embodiments may be achieved.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein, or both. It is intended that the specification and the described examples are considered as exemplary only, with the true scope and spirit of the invention indicated by the following examples.

What is claimed is:

1. A method for controlling a brushless motor having an inverter providing a current to said brushless motor, said inverter comprising:
   a first plurality of switching elements connected between a first terminal of a DC power source and a phase terminal of each coil of said brushless motor;
   a second plurality of switching elements connected between a second terminal of said power source and a phase terminal of each coil of said brushless motor; and
   a drive control device for selecting a state of said first plurality of switching elements and of said second plurality of switching elements, whereby either said state of said first plurality of switching elements or said state of said second plurality of switching elements is controlled by a pulse width modulation (PWM) control, so that said drive control device controls a rotational speed of said brushless motor; wherein said method comprising the steps of:

determining whether a combined voltage of a first transient voltage and a second transient voltage exceeds a voltage limit; and altering the switching of said state of said first plurality of switching elements by said PWM control, such that said combined voltage is less than a voltage limit of said first plurality of switching elements or said second plurality of switching elements; and wherein said first transient voltage is generated between an input terminal and an output terminal of each of said second switching element in said off-state, when said state of said second plurality of switching elements is switched; and wherein said second transient voltage is generated between an input terminal and an output terminal of each of said first switching element in said off-state, when said first plurality of switching element is switched.

2. The method of claim 1, further comprising the step of altering the switching said state of said first plurality of switching elements by said PWM control, such that the occurrence of a first maximum value of said second transient voltage is separated by more than a predetermined period from the occurrence of a first maximum value of said first transient voltage.

3. The method of claim 1, further comprising the step of preventing the switching of said state of said first plurality of switching elements by said PWM control during a predetermined time interval preceding the occurrence of a first maximum value of said second transient voltage.

4. The method of claim 1, wherein said brushless motor drives a compressor for an automotive air conditioner.

5. A method for controlling a brushless motor having an inverter providing a current to said brushless motor, said inverter comprising:

a first plurality of switching elements at a first side of said inverter connected between a first terminal of a DC power source and a phase terminal of each coil of said brushless motor;

a second plurality of switching elements at a second side of said investor connected between a second terminal of said power source and a phase terminal of each coil of said brushless motor; and a drive control device for selecting a state of said first plurality of switching elements and said second plurality of switching elements whereby either said state of said first plurality of switching elements or said state of said second plurality of switching elements is controlled by a pulse width modulation (PWM) control, so that said drive control device controls a rotational speed of said brushless motor; wherein said method comprising the steps of:

determining whether a combined voltage of a first transient voltage and a second transient voltage exceeds a voltage limit; and altering the switching of said state of said first plurality of switching elements by said PWM control, such that said combined voltage is less than a voltage limit of said first plurality of switching elements or said second plurality of switching elements; and wherein said second transient voltage is generated between an input terminal and an output terminal of each of said second switching element in said off-state, when said state of said first plurality of switching elements is switched; and wherein said second transient voltage is generated between an input terminal and an output terminal of each of said second switching element in said off-state, when said second plurality of switching element is switched.

6. The method of claim 5, further comprising the step of altering the switching said state of said second plurality of switching elements by said PWM control, such that the occurrence of a first maximum value of said second transient voltage is separated by more than a predetermined period from the occurrence of a first maximum value of said first transient voltage.

7. The method of claim 5, further comprising the step of preventing the switching of said state of said second plurality of switching elements by said PWM control during a predetermined time interval preceding the occurrence of a first maximum value of said second transient voltage.

8. The method of claim 5, wherein said brushless motor drives a compressor for an automotive air conditioner.

9. An apparatus for controlling a brushless motor having an inverter providing a current to said brushless motor, said inverter comprising:

a first plurality of switching elements at a first side of said inverter connected between a first terminal of a DC power source and a phase terminal of each coil of said brushless motor;

a second plurality of switching elements at a second side of said inverter connected between a second terminal of said power source and a phase terminal of each coil of said brushless motor; and a drive control device for selecting a state of said first plurality of switching elements and of said second plurality of switching elements, whereby either said state of said first plurality of switching elements or said state of said second plurality of switching elements is controlled by a pulse width modulation (PWM) control, such that said device controls a rotational speed of said brushless motor, determines whether a combined voltage of a first transient voltage and a second transient voltage exceeds a voltage limit, and alters a timing of switching said state of said first plurality of switching elements by said PWM control, such that said combined voltage is less than said voltage limit of said first plurality of switching elements or a said second plurality of switching elements, wherein said first transient voltage is generated between an input terminal and an output terminal of each of said second switching elements in said off-state, when said state of said second plurality of switching elements is switched, and wherein said second transient voltage is generated between an input terminal and an output terminal of each of said first switching elements in said off-state, when said state of said first plurality of switching element is switched.

10. The apparatus of claim 9, wherein said drive control device comprising:

a detection device for detecting a rotation position of said brushless motor at a detection time during a predetermined period T;

a phase switching device for selecting each of said first plurality of switching elements or of said second plurality of switching elements that are receiving current in order to switch said state of said first plurality of switching elements and second plurality of switching elements, when a first predetermined time period is elapsed from said predetermined period after said phase switching device switches said state of said first plurality of switching elements and of said second plurality of switching elements based on detection of said rotation position;

an on-state setting device for setting said state of said second switching elements that are receiving current and are selected by said phase switching device; and a PWM control device for generating a PWM control pulse signal to said first switching element selected by said phase switching device in synchronization with said detection time in said predetermined period T during a second predetermined time period in which the state of said first switching elements remains unchanged, wherein a duration of said second predetermined time period begins from said detection time and extends to a certain point at which third time period has passed, such that said duration of said second predetermined time period is set as a combined voltage of said first transient voltage and said second transient voltage is less than said voltage limit of said first and second plurality of switching elements, wherein a time interval extends before or after a center point of said second predetermined time period.

11. The apparatus of claim 9, said brushless motor is a tree-phase-type motor having three coils.

12. The apparatus of claim 9, wherein said brushless motor drives a compressor for an automotive air conditioner.

13. A apparatus for controlling a brushless motor having an inverter providing a current to said brushless motor, said inverter comprising:

a first plurality of switching elements are at a first side of said inverter connected between a first terminal of a DC power source and a phase terminal of each coil of said brushless motor;

a second plurality of switching elements at a second side of said inverter connected between a second terminal of said power source and a phase terminal of each coil of said brushless motor; and a drive control device for selecting a state of said second plurality of switching elements and of said second plurality of switching elements, whereby either said state of said first plurality of switching elements or said state of said second plurality of switching elements is controlled by a pulse width modulation (PWM) control, controlling a rotational speed of said brushless motor, determines whether a combined voltage of a first transient voltage and a second transient voltage exceeds a voltage limit, and alters a timing of switching said state of said second plurality of switching elements by said PWM control, such that said combined voltage is less than said voltage limit of said first plurality of switching elements or of said second plurality of switching elements, wherein said first transient voltage is generated between an input terminal and an output terminal of each of said first switching elements in said off-state, when said state of said first plurality of switching elements is switched, and wherein said second transient voltage is generated between an input terminal and an output terminal of each or said second switching elements in said off-state, when said state of said second plurality of switching element is switched.

14. The apparatus of claim 13, wherein said drive control device comprising:

a detection device for detecting a rotation position of said brushless motor at a detection time during a predetermined period T;

a phase switching device for selecting each of said first plurality of switching elements or of said second plurality of switching elements that are receiving current in order to switch said state of said first and second plurality of switching elements, when a first predetermined time period is elapsed from said predetermined period T after said phase switching device switches said state of said first plurality of switching elements and second plurality of switching elements based on detection of said rotation position;

an on-state setting device for setting said state of said first switching elements that are receiving current and are selected by said phase switching device; and a PWM control device for generating a PWM control pulse signal to said second switching element selected by said phase switching device in synchronization with said detection time in said predetermined period T during a second predetermined time period in which the state of said second switching elements remain unchanged, wherein a duration of said second predetermined time period begins from said detection time and extends to a certain point at which a third time period has passed, such that said duration of said second predetermined time period is set as a combined voltage of said first transient voltage and said second transient voltage is less than said voltage limit of said first and second plurality of switching elements, wherein a time interval extends before or after a center point of said second predetermined time period.

15. The apparatus of claim 13, said brushless motor is a three-phase-type motor having three coils.

16. The apparatus of claim 13, wherein said brushless motor drives a compressor for an automotive air conditioner.

* * * * *